United States Patent [19]

Hayes

[11] Patent Number: 4,619,995

[45] Date of Patent: Oct. 28, 1986

[54] N,O-CARBOXYMETHYL CHITOSAN AND PREPARATIVE METHOD THEREFOR

[75] Inventor: Ernest R. Hayes, Wolfville, Canada

[73] Assignee: Nova Chem Limited, Halifax, Canada

[21] Appl. No.: 685,559

[22] Filed: Dec. 24, 1984

[51] Int. Cl.[4] .............................................. C08B 37/08
[52] U.S. Cl. ...................................... 536/20; 426/273; 426/302
[58] Field of Search ........................................... 536/20

[56] References Cited

U.S. PATENT DOCUMENTS

| | | | |
|---|---|---|---|
| 3,560,480 | 2/1971 | Kruger | 536/114 |
| 3,953,608 | 4/1976 | Vanlerberghe et al. | 536/20 |
| 4,063,016 | 12/1977 | Austin | 536/20 |
| 4,195,175 | 3/1980 | Peniston et al. | 536/20 |
| 4,301,067 | 11/1981 | Koshugi | 536/20 |
| 4,304,905 | 12/1981 | Koshugi | 536/20 |
| 4,308,377 | 12/1981 | Koshugi | 536/20 |

OTHER PUBLICATIONS

L. A. Nud'ga et al., "O–Alkylation of Chitosan", Journal of General Chemistry of the USSR, Jun. 1, 1974, pp. 2729–2732 (Translation by Consultants Bureau, Plenum Publishing Corp. of *Zhurnal Obshchei Khimii*, vol. 43, No. 12, pp. 2752–2756, Dec. 1973).

Riccardo A. A. Muzzarelli et al., "N–(Carboxymethylidine) Chitosans and N–(Carboxymethyl) Chitosans: Novel Chelating Polyampholytes . . . ", *Carbohydrate Research*, 107 (1982) pp. 199–214, Elsivier Scientific Publishing Co.

Koshugi et al., "Chem. Abst.", vol. 95, 1981, p. 45101(m).

Hirano et al., "Chem. Abst.", vol. 95, 1981, p. 113891.

*Primary Examiner*—Johnnie R. Brown
*Attorney, Agent, or Firm*—D. Ron Morrison

[57] ABSTRACT

A novel chitosan derivative, having carboxymethyl substituents on some of both the amino and primary hydroxyl sites of the glucosamine units of the chitosan structure, is disclosed, together with methods for its preparation starting from either chitosan or chitin.

8 Claims, No Drawings

N,O-CARBOXYMETHYL CHITOSAN AND PREPARATIVE METHOD THEREFOR

This invention relates to a derivative of chitosan, more particularly to a carboxymethyl derivative thereof, and specifically to the derivative designated as N,O-carboxymethyl chitosan. The invention also relates to preparative methods for the material.

Chitin, a polysaccharide, is the biopolymer said to occur in nature in greater quantities than any other biopolymer except cellulose. Its most common occurrence is in the shells of crustaceans, eg. crabs, shrimps and lobsters, where it occurs generally in admixture with mineral and proteinaceous material. Basically, chitin is a polymer of the N-acetyl glucosamine monomer unit, although some of the monomer units in its structure are devoid of the acetyl substituent and chitin could more properly be said to be a copolymer of N-acetyl glucosamine and glucosamine monomers, with the latter constituting a variable proportion, generally from 12 to 20 percent of the monomer units, usually substantially 16 to 17 percent.

Chitosan is derived from chitin by removal of most of the acetyl substituents on the copolymer, usually by hydrolysis, to leave a copolymer having generally from 13 to 17 percent of N-acetyl glucosamine monomer units and correspondingly from 87 to 83 percent of glucosamine units in its structure.

Naturally occuring chitin, contaminated as it is with inorganic salts, most commonly some form of calcium carbonate, and with various proteins, must generally be processed to remove most, if not all, of the contaminants before it can be used in industrial or commercial applications. Even the simple deacetylation of chitin to chitosan generally requires that "raw" or "crude" chitin, being obtained from a natural source, be processed to "purified" form before it can be hydrolysed to an acceptable chitosan. The task of developing useful and profitable applications for chitin and chitosan is beset with a number of problems, the most pressing of which has been said to be the need for standard, uniform materials that can be called chitin and chitosan (vide: Chemical and Engineering News, 14 May 1984, pages 42-45 at page 45). Thus, in the present state of the art, it is well recognized that chitin and chitosan are not pure or even uniform materials and, as copolymers of the same two basic monomer units, their compositions are bound to be subject to variations, for example in relative proportions of the two monomer units, in degree of polymerization (molecular weight), and degree of substitution for various derivatives made therefrom. Such variations in composition are bound to be responsible for some variations in properties of the materials, and it can be readily understood why it would be advantageous to obtain materials of consistent composition, so that materials of uniform properties would be available for various industrial and commercial applications.

Carboxymethyl derivatives of both chitin and chitosan have been referred to in the literature. R. C. Capozza, in U.S. Pat. No. 3,911,098 issued 7 October 1975, at column 4, lines 27-37, has characterized carboxymethyl chitin as poly[N-acetyl-6-O-(carboxymethyl)-D-glucosamine]. This is only an approximation to the probable structure, as it completely ignores the presence, in the (co)polymer chain, of the now recognized proportion of glucosamine units, in which units there is no acetyl substituent on the nitrogen atom. It appears that Capozza intended to have all the amine nitrogen atoms in the copolymer blocked by acetyl groups and thus have all substituent carboxymethyl groups restricted to attachment at the 6-0 positions. However, at column 5 lines 7-9 of the patent, Capozza acknowledges that some, apparently very minor proportion, of the attachment may occur at the 3-0 positions, but no recognition is given to the possibility of attachment of a carboxymethyl group at any 2-N site which is not blocked by an acetyl group. Other researchers also have reported the preparation of the carboxymethyl derivative of chitin, eg. R. Trujillo in Carbohyd. Res. Z, 483-485 (1968); R. H. Hackman and M. Goldberg, ibid 38, (1974) 35-45; Danilov and Plisko, Zhurnal Obshchei Khimii, Vol. 31, No. 2, 469-473 (Feb. 1961); and E. Hultin, Acta Chem. Scand. 9 (1955) No. 1, pgs. 102-103. None of these dealt with the carboxymethyl derivatives of chitosan.

In contrast to chitin, in which most of the amino groups are protected from possible alkylation by blockage of the nitrogen site with an acetyl group, chitosan has many free amino groups which are open to alkylation (and carboxyalkylation) along with the hydroxy groups in the chitosan. This was noted in the Journal of General Chemistry of the USSR by L. A. Nud'ga, E. A. Plisko, and S. N. Danilov (Zh. Obshch. Khim. 1973, 43(12), 2752-6), who disclosed the preparation of O-carboxymethyl chitosan. The specific O-alkylation was achieved by forming a Schiff base of the chitosan, eg. with salicylaldehyde, and reacting this base in alkaline medium with sodium monochloroacetate; O-carboxymethyl chitosan was recovered by regeneration from the Schiff base, but little information on the nature and properties of the product was given.

To prepare the corresponding N-substituted derivative, N-carboxymethyl chitosan, R. A. A. Muzzarelli et al. (Carbohydrate Research 107 (1982) 199-214) reacted chitosan with glyoxylic acid to produce a soluble gel-forming imine (a Shiff base), then reduced the latter with suitable reducing agent, eg. cyanoborohydride, to give the desired N-carboxymethyl chitosan. With the method of preparation, the carboxymethyl substituent clearly was placed exclusively of the N-atom, with no O-substitution taking place. These authors produced a series of the products having various degrees of acetylation and N-carboxymethylation and characterized them to some extent, eg. viscosity and infra-red spectrometry; the products were also asserted to have chelating powers for metal ions.

It has now been found that carboxymethyl substituted chitosans having carboxymethyl substituents both on some of the hydroxyl oxygen atoms and on some of the nitrogen atoms of the glucosamine units can be prepared, and that such substituted chitosans, designated as N,O-carboxymethyl chitosan, are water soluble and have distinctive and unique properties rendering them effective to form selectively permeable films or membranes. Because of the selective permeability, these films are particularly valuable as food preservatives.

The invention thus consists in the substituted chitosan product which is identified as N,O-carboxymethyl chitosan. The invention further consists in polymer films selectively permeable to various gases and consisting of N,O-carboxymethyl chitosan. The invention still further consists in the method for preparation of N,O-carboxymethyl chitosan which comprises 1. dispersing solid chitosan in a liquid medium of the group consisting of isopropyl alcohol, n-butanol, isobutanol, methyl ethyl ketone, toluene, and ethanol-toluene mixtures containing at least 72 mole percent toluene, to form a slurry, 2. steeping the chitosan in caustic medium by adding strong aqueous sodium hydroxide solution to the slurry, in a proportion of three to eight mols sodium hydroxide per mol of glucosamine monomer unit in the chitosan, with stirring to maintain the chitosan dispersed in the the caustic medium for a period of from 0.5 to 1.0 hours, 3. thereafter adding monochloroacetic acid to the caustic medium, in a proportion of substantially one mol of the acid for each 1.8 to 2.2 mols of sodium hydroxide in the caustic medium, then heating the slurry with continued stirring to a reaction temperature of from substantially 40° C. to substantially 70° C. 4. maintaining the stirred slurry at the reaction temperature for a reaction period of substantially two to twelve hours and sufficient to complete reaction between the chitosan and sodium monochloroacetate to form N,O-carboxymethyl chitosan, 5. adding any necessary small portion of water to the slurry to enable measurement of the pH of the suspending liquid, then adding glacial acetic acid to the slurry until its pH is lowered to substantially 7.0, and 6. recovering the N,O-carboxymethyl chitosan product from the slurry by separating the solid thereof and washing same with solvents to remove extraneous salts without dissolving the product.

Throughout this specification and claims, all proportions, percentages, and ratios are used on a weight basis unless otherwise specifically indicated.

The methods for preparing the polymeric materials of this invention use reactions generally similar to substitution reactions that have been used in the art for carboxymethylation of cellulose, chitin and chitosan. However, because chitin and chitosan have variable compositions and properties, eg. molecular weight and relative proportions of monomer units as previously noted, it is important to control the reaction conditions carefully to achieve the desired uniform and consistent products.

The following example is given to illustrate a preferred laboratory procedure for preparation of a particular product having valuable properties as a food preservative.

EXAMPLE 1

To 20.0 g of a commerical chitosan product obtained from Japan, 200 mL of isopropyl alcohol was added and the resulting slurry stirred in a one liter flask at 25° C. To the stirred slurry, over a period of 20 minutes, 50.4 mL of 10N aqueous NaOH solution was added in six equal portions at four minute intervals. The alkaline slurry was stirred for an additional 45 minutes, then 24.0 g of solid monochloroacetic acid added in five equal portions at five minute intervals over a period of twenty minutes. Heat was then applied to bring the reaction mixture to a temperature of 60° C. and stirring at this temperature was continued for three hours. Next 17 mL of cold distilled water was added to the mixture and its measured pH, determined with a pH meter, adjusted to 7.0 by addition of glacial acetic acid. The reaction mixture was then filtered and the solid product added to 300 mL of a 70% v/v methanol/water mixture in which it was stirred to wash the product. The solid product was again filtered then dispersed in 300 mL of anhydrous methanol in which it was stirred to wash it. The washed product was finally filtered, collected and dried overnight in an oven at 60° C. Yield of the resultant N,O-carboxymethyl chitosan product was 30 grams.

Using the foregoing procedure, but with the monochloroacetic acid labelled with carbon-13, a sample of N,O-carboxymethyl chitosan was prepared for nuclear magnetic resonance spectroscopy. The NMR spectrum of the product labelled with C-13 confirmed the presence of both $-NH^{13}CH_2COONa$ and $-O^{13}CH_2COONa$ groups with the peak attributed to the latter group being considerably larger than that of the former.

Samples of N,O-carboxymethyl chitosan, prepared as described in Example 1 above, dissolve readily in water to form 1% solutions that can be coated on a substrate and dried to form polymer films. The films have selective permeability for gases, and the foregoing 1% solutions can be coated on various delicate products, for example fruit, vegetables, hatchery eggs and table eggs, to form preservative films of remarkable effectiveness. As an illustration of this effectiveness, it was found that when apples, ripe for storage, were dipped in or sprayed with a 1% aqueous solution of N,O-carboxymethyl chitosan made as described above, the film formed on the apples had selective permeability to the gases carbon dioxide, ethylene, and oxygen. The film retained carbon dioxide within the apples, kept oxygen out, and allowed ethylene to escape from the apples through the film, to the extent that the useful life of the coated apples, stored at normal low storage temperature, was extended by several months. A film formed by dipping an apple in 1% solution as aforesaid was examined by electron microscopy; photographs showed that the film was a continuous coating which appeared to be well attached to the apple skin, followed the contours of the surface, and had a fairly uniform thickness of a few, generally one to four, microns. Regular consumption by samples of such coated apples for several months by research workers produced no observable effects attributable to the coatings.

Films of one to ten micron thickness appear to be satisfactory for the desired preservative action for apples as described above. Similar excellent success has been achieved in extending the storage life of Bartlett pears for several months by coating them with N,O-carboxymethyl chitosan films before storage, as described for the apples above. Other products recommended for coating with N,O-carboxymethyl chitosan to improve storage quality include for example peppers, tomatoes, cauliflower, brussel sprouts, strawberries, squash, and table eggs, all destined for human consumption.

The coating of hatchery eggs with films of the product of this invention has also been found to improve the hatching rate of such eggs which must be stored for up to three weeks, eg. for purpose of transportation to a remote location hatchery, before being hatched. The yield of thriving hatched chicks is significantly improved by the coating, and the procedure does not cause entry of the coating material into human diet, hence the procedure does not require approval from government food or health administrators for utilization.

In addition to its property of forming films selectively permeable by various gases, the product of this invention has other properties which can create significant utility for the product. For example, N,O-carboxymethyl chitosan has been found to form some type of chemical bonding with ions of numerous heavy metal elements, thus binding or sequestering them from aqueous solution when they are present in even only very dilute concentrations, eg. 10 to 1,000 ppm. With higher concentrations of these elements, eg. 100 to 10,000 ppm, 1% aqueous solutions of N,O-carboxymethyl chitosan gradually form stiff gels which are resistant to dissolution by additional water. This property suggests potential use of aqueous N,O-carboxymethyl chitosan solutions for plugging porous underground strata adjacent oil and gas well drilling sites, to permit better retention of pressure in a drill hole or in an injection well. Examples of the heavy metal elements whose ions cause aqueous N,O-carboxymethyl chitosan solutions to gel are: iron, copper, mercury, nickel, silver, zinc, and to some extent calcium; other heavy metal ions also may be found to participate in this utility but barium, vanadium, tin, cadmium, aluminum, and magnesium do not do so.

Another valuable property of the product of this invention is its ability to react in aqueous solution with cross-linking compounds, for example glyoxal and other dialdehydes, captan, and other diketones; when the cross-linking compounds are present in small proportions, (eg. 5% by weight of the polymer), they slowly form a gel by cross-linking with N,O-carboxymethyl chitosan; when they are added in higher proportions, (eg. 0.5–1:1 by weight of the polymer) to aqueous solutions of N,O-carboxymethyl chitosan, they cause the almost instantaneous formation of a stiff gel. So rapid is the formation of the gel from the aqueous solution that, if stirring thereof to distribute the reactant uniformly throughout the solution has entrapped any air bubbles beneath the solution surface, the air bubbles become entrapped permanently in the gel; the gelation of the solution destroys its mobility and renders the stirring ineffective and the solution immobile. Such gel forming properties may be useful to assist separation of water from organic solvents, as well as in oil well pressure retention as described above.

The invention thus further consists in water resistant gels made from aqueous solutions of N,O-carboxymethyl chitosan by reaction of said solutions with aqueous solutions of ions of metals of the group consisting of iron, copper, mercury, nickel, silver, zinc, and calcium, or by reaction of said N,O-carboxymethyl chitosan solutions with cross-linking compounds of the group cross-linking dialdehydes and cross linking diketones.

Reference has been made earlier herein to the importance of controlling the reaction conditions used in order to obtain desirable uniform and consistent products. The nature of the most important of these factors will now be discussed.

To begin with, "raw" or "crude" chitin, to be processed into a purified form, must be subjected to generally severe or harsh conditions, eg. strong acids and elevated temperature to remove calcium carbonate impurity. Such conditions can also degrade and radically reduce the molecular weight of the polymer chains of chitin, leaving a low molecular weight "purified" product whose derivatives will likewise be only of low molecular weight. Similarly, the conversion of chitin into chitosan may be carried out under harsh or severe conditions, eg. strong aqueous caustic steeping, which can further reduce the molecular chain length of the polymeric material. Thus to obtain N,O-carboxymethyl chitosans of uniform and consistent properties, it is important: (a) to have a supply of "purified" chitin starting material of reasonably uniform properties, (b) for the chitosan prepared therefrom to be prepared under consistent and uniform conditions, and (c) for the carboxymethylation of the chitosan to form the products of this invention to be carried out under carefully controlled conditions. The requirements of criteria (a) and (b) noted above can be met by conditions established in the art. The conditions referred to in criterion (c) above are now to be indicated.

Being a solid biopolymeric material, chitosan is understood to be made up of randomly coiled, intertwined, and interlocked polymer chain molecules. In order to insert substituents at a combination of designated positions in the molecules of these polymer chains, it is necessary to loosen the coiling and interlocking of the chains by swelling the solid polymer, while it is slurried in an appropriate liquid, with sodium hydroxide added to the dispersing liquid as a strong aqueous caustic solution. The caustic solution should be concentrated, eg. between 25% and 50% caustic, to minimize the proportion of water introduced to the system while ensuring effectiveness of penetration of the interlocking of polymer chains. The proportion of sodium hydroxide that beneficially is used ranges from substantially three to eight mols per mol of glucosamine monomer units in the chitosan to be reacted. The water that accompanies the proportion of sodium hydroxide in the aqueous caustic solution also is absorbed by the chitosan, to some extent at least, hence concentrated (25% to 50%) caustic solutions are used to provide optimum penetration by sodium hydroxide while penetration by the water is occurring. The penetration by water and sodium hydroxide is not instantaneous, and a steeping period of at least half an hour, preferably substantially one hour, with continuous stirring is allowed for penetration to occur. Liquids which are appropriate for slurrying the chitosan for this swelling action include isopropanol, n-butanol, isobutanol, methyl ethyl ketone, toluene, and ethanol-toluene mixtures containing at least 72 mol percent toluene. Generally they may be said to be liquids which do not dissolve nor soften chitosan but do effectively distribute the aqueous caustic solution between the particles of chitosan in the slurry. Other liquids have been tried and found to be far less effective or completely ineffective for assisting uniform penetration of the chitosan particles by the aqueous caustic. For example methanol, ethanol, acetone, dimethyl sulfoxide, and dimethyl formamide are not appropriate liquids for this purpose, some of them perhaps because they are too effective a solvent for sodium hydroxide and tend to retain it in solution rather than allowing it to penetrate into solid chitosan particles with its accompanying aqueous phase.

When the swelling and penetration of the chitosan have been achieved, solid monochloroacetic acid is added to the slurry in a proportion of substantially one mol of monochloroacetic acid for each 1.8 to 2.2 mols of sodium hydroxide in the steeping medium. Stirring is continued while the slurry is heated to temperature in the range 40° C. to 70° C. and maintained at this temperature for a reaction period sufficient to complete reaction between chitosan and sodium monochloroacetate which rapidly forms from the sodium hydroxide and monochloroacetic acid. The reaction with chitosan is much slower and generally requires from two to twelve hours for completion, depending considerably on the reaction temperature, the higher temperatures producing faster reactions as would be expected. Generally the reaction is completed in three hours at 60° C. and in two hours at 70° C.

Following completion of the reaction, the excess sodium hydroxide must be neutralized and the extraneous salts washed from the product. This is conveniently achieved by adding glacial acetic acid in amount sufficient to bring the pH of the slurry to substantially 7.0; to facilitate pH measurement, eg. with a pH meter, it may be necessary to add a small portion of water to the slurry. The monochloroacetic acid-chitosan reaction produces byproduct sodium chloride and the excess caustic neutralization produces sodium acetate. As these salts, particularly the sodium chloride, have only slight solubility in slurry liquid, some water must be used to dissolve and wash them out. A mixture of 70:30 methanol:water is an effective and efficient wash liquid; the proportion of water must be low enough to preclude swelling or dissolving the chitosan derivative product. A final washing with anhydrous methanol facilitates subsequent drying of the product. Other liquids which are suitable for washing extraneous salts from the product include, for example, isopropanol, ethanol, and acetone; however on a cost basis they generally are less effective than the previously mentioned methanol, particularly if excise tax regulations must be taken into account.

It has been noted above that NMR spectroscopy combined with carbon-13 labelling has permitted positive identification of the product of this invention as a carboxymethyl substituted chitosan, having the substituents on both the N- and O-sites and not exclusively on one or the other site. Another analytical method, which has developed more recently than publication of much of the available literature on chitosan, arises from the procedures of analytical pyrolysis. In these procedures, which provide valuable information in polymer analysis for both synthetic and natural macromolecular structures, a pyrolyzer, providing highly reproducible thermal treatment for samples of diverse types, eg. powders, films, pellets, fibres, and bulk materials, serves to decompose a sample into many lower molecular weight fragments. The fragments are collected then separated into fractions by various chromatographic methods. The pyrolyzate produced by a polymer of any one composition, on pyrolysis for such analyses, will provide a spectrum of fragments separable by chromatography to produce a characteristic read-out or pyrogram which can be used to identify or positively distinguish the composition. Thus the pyrogram of chitosan will positively distinguish the material from chitin and its pyrogram, and in fact the derivatives N-carboxymethyl chitosan, O-carboxymethyl chitosan, and N,O-carboxymethyl chitosan are distinguishable by their pyrograms. Laboratory samples of carboxymethyl chitosan products prepared by the methods described by Muzzarelli et al and by Nud'ga et al have been compared with samples of the N,O-carboxymethyl chitosan of the present invention using this analytical pyrolysis technique, and the distinctiveness of the pyrograms of each of the three materials have been confirmed.

Reference has been made earlier herein to the selective permeability of films of N,O-carboxymethyl chitosan. Selective permeability for gases is a desirable property for thin films when it is desired to separate thereby two gases which are in admixture, or at least to change the relative concentrations of two gases from a gas mixture. Gas permeation studies have shown that films of N,O-carboxymethyl chitosan are, for example, substantially eight times more permeable to acetylene than they are to ethylene when these gases are in admixture. Thus this selective permeability of the film for these two gases will permit the concentration of acetylene relative to the ethylene in a mixture of the gases which is allowed to permeate through such a film. Furthermore the permeability of the films for carbon dioxide and oxygen is low, whereas the permeability for ethylene is significant; with such a combination of selective permeabilities, films of N,O-carboxymethyl chitosan have ideal properties for a preservative coating on fresh fruits and vegetables.

The relative permeability of films of N,O-carboxymethyl chitosan to various gases and mixtures of gases serves as an additional characteristic by which the material can be identified and/or distinguished from other similar materials. It has been noted above that NMR spectra and analytical pyrolysis programs also can be used to identify or distinguish the product of this invention. None of the published literature has disclosed the use of gas permeability, NMR spectra, or analytical pyrolysis to identify or distinguish the composition of carboxymethyl derivatives or chitosan. The characteristics or properties of solubility, viscosity, and degree of substitution have been used in the art, but these are much less intrinsic or subject to less precise determination than the methods herein referred to for identification and distinction of the product of the present invention.

Despite the lower precision of their measurement or the lower distinctiveness of these properties, solubility, viscosity, and degree of substitution are nevertheless of some significance for N,O-carboxymethyl chitosan. Chitosan itself is insoluble in pure water, but (unlike chitin) it is soluble in weakly acidic aqueous media, in which it is present as the acid salt. The carboxymethyl derivatives of chitosan, whether they be the exclusively N-substituted or the exclusively O-substituted derivative, or the N- and O-substituted derivative of the present invention, are unique water soluble gums in that they contain an amino group, either as the primary amine ($-NH_2$) or as the secondary amine ($-NHCH_2COOH$). The degree of water solubility of these derivatives, particularly the N- and O-substituted product of the present invention, is variable, as it appears to vary with the molecular weight of the material as well as with the degree of substitution. For some of the materials, the degree of water solubility is limited to a point where the material partly forms an observable separate gel phase as well as partly dissolving in water. Such variations in water solubility also give rise to variations in the viscosity of solutions of the materials. The viscosity of a one percent aqueous solution of a completely water soluble N,O-carboxymethyl chitosan of the present invention may range for example from 15 to 1000 centipoises. For such reasons, solubility, viscosity, and degree of substitution are clearly unsuitable characteristics to identify or distinguish the materials. The formation of a separate gel phase by part of a sample of N,O-carboxymethyl chitosan dispersed in water to give a one percent solution may be indicative of variability in the substitution throughout the sample, and/or of large variations in molecular weight therethrough. The presence of gel with an aqueous solution creates an abnormally high viscosity in the solution and renders difficult or impossible the formation of a completely smooth film on a substrate, eg. on an apple; hence it is most desirable to have gel-free solutions for such commercial applications, but for other commercial applications, eg. coating hatchery eggs, film smoothness is of less significance. In most cases the gel can be dissolved by heating the solution; solutions that have been heated to dissolve gel have lower viscosities than initially but higher viscosities than those solutions which are initially gel-free.

Inasmuch as the degree of substitution of carboxymethyl groups on chitosan is of some significance with regard to the water solubility of the material, additional comment on this factor becomes appropriate. A degree of substitution of 1.0 for carboxymethyl chitosan indicates that, on average, there is one carboxymethyl group substitution per glucosamine monomer unit in the chitosan, but it gives no indication of the position of the substitution. As the degree of substitution (D.S.) is an average for the entire chitosan polymer molecule, a value less than one indicates that not all the monomer units are substituted. Theoretically each monomer unit could have substitution on the N-position and on each of the two hydroxyl O-positions in chitosan (the 3 O- and 6 O-positions), but, primarily because of steric factors, only the —$NH_2$ group and the hydroxyl in the 6 position can be expected to enter significantly into the substitution reaction. Thus a maximum D.S. not greater than 2 is likely to occur. A D.S. between 1 and 2 would indicate that at least some substitution may be present on both the 6 O-position and either the N-position or possibly the 3 O-position. A D.S. of 1.0 or less could indicate that all the substitution is present at only the 6 O-position or only the N-position, for example the previously mentioned products O-carboxymethyl chitosan and N-carboxymethyl chitosan described by L. A. Nud'ga et al and by R. A. A. Muzzarelli et al respectively. Nud'ga et al specifically stated that, with their product O-carboxymethyl chitosan, water solubility was not achieved unless the degree of substitution was 1.0, i.e. it was not achieved at any D.S. below 1.0. In contrast, the N-carboxymethyl chitosans obtained as white, free-flowing powders by Muzzarelli et al were reported to be soluble in water, at all pH values, regardless of their degree of substitution which ranged from 0.25 to 1.0. The N,O-carboxymethyl chitosans of the present invention, when made from chitosan by the method already described herein, have a D.S. that may range between substantially 0.4 and substantially 0.8, i.e. significantly less than 1.0. It is entirely unexpected that, when reaction conditions are adapted to achieve carboxymethyl substitution simultaneously at both the N- and O-positions, a degree of substitution so significantly lower than 1.0 would occur and at the same time provide a water soluble product with properties so different from the reactant chitosan and also from the prior art products which are substituted exclusively in the N-position or exclusively in the O-position.

There has been described earlier herein a typical laboratory operation for the preparation of the product of the present invention. The same procedure has been operated on a much larger scale to produce the same product in a pilot plant operation scaled up from the preceding Example by a factor of about 2000. Reproducibility of the degree of substitution and the viscosity of 1% aqueous solutions of the product was excellent and they corresponded satisfactorily with properties of the laboratory produced samples.

A major disadvantage of the previously described method for preparation of N,O-carboxymethyl chitosan lies in the cost of the initial chitosan reactant. The preparation of this material from chitin has been carried out in the art by numerous different methods, all involving deacetylation with caustic, usually sodium or potassium hydroxide in a liquid or molten medium. It has been found possible to carry out the deacetylation of chitin to chitosan as a preliminary step, in combination with the steps previously described herein for carboxymethylation of the chitosan, without having to separate the chitosan from the deacetylation reaction mixture. The invention thus further consists, in the method for preparation of N,O-carboxymethyl chitosan previously described herein, of preliminarily preparing chitosan dispersed in a liquid medium of the group consisting of isopropyl alcohol, n-butanol, isobutanol, methyl ethyl ketone, toluene, and ethanol-toluene mixtures containing at least 72 mol percent toluene by (a) dispersing granular sized chitin in said liquid medium to form a slurry of chitin, (b) slowly adding a strong aqueous sodium hydroxide solution to the stirred slurry over a period of 10 to 30 minutes and in a proportion to provide substantially five to nine mols sodium hydroxide per mol N-acetyl glucosamine units in the chitin, (c) heating the stirred slurry to a temperature in the range of 75° C. to 100° C. and maintaining it in this range for a period of 2.5 to 3.5 hours, (d) allowing the slurry to cool to ambient room temperature and to steep until the chitin has been substantially deacetylated to chitosan and the chitosan has steeped in the caustic medium for a brief period, typically 0.5 to 1.0 hours.

The following example is given to illustrate a suitable procedure for the preparation of N,O-carboxymethyl chitosan, starting from chitin, in accordance with the combination of stages disclosed above.

EXAMPLE 2

To 20.0 g chitin product, supplied by the New Brunswick Research and Productivity Council and derived from crabshell wastes, 200 mL of isopropyl alcohol was added and the resulting slurry stirred in a liter flask at 25° C. To the stirred slurry over a period of 20 minutes, 56.0 mL of 16N aqueous sodium hydroxide was added. Heat was applied to bring temperature of the reaction mixture to 80° C. and maintain it, under stirring, for three hours. The slurry was then allowed to steep for a minimum of 0.5 hours. Following the steeping, the resulting slurry of chitosan was reacted in accordance with the procedure described in Example 1; 40.4 g solid monochloroacetic acid was added to the stirred slurry, in five equal portions at five minute intervals over a period of 20 minutes. Heat was then applied to bring the reaction mixture to 60° C. which was maintained with stirring for three hours. Using a pH meter to determine acidity, the pH of the slurry was adjusted to 7.0 by gradual addition of glacial acetic acid. The reaction mixture was then filtered and the solid product washed twice with 500 mL of a 70% v/v methanol/water mixture; the solid product was again recovered by filtering and washed with 500 mL anhydrous methanol. The washed product was again filtered and dried overnight at 60° C. in an oven. The yield of N,O-carboxymethyl chitosan product was 27.0 g. Its properties were similar to those of the product of Example 1 except that the molecular weight and solution viscosities were considerably lower due to the low molecular weight of the chitin starting material.

It will be noted that in Example 2, in an initial stage, chitin is deacetylated to chitosan with caustic in an appropriate liquid medium, providing chitosan whose particles have already been penetrated by sodium hydroxide; the chitosan, thus penetrated and swollen by caustic, is thereby available for reaction with monochloroacetic acid without first having to be separated or recovered from the liquid deacetylation medium. This considerably simplifies the processing of chitin to N,O-carboxymethyl chitosan. Other factors contributing to the simplification of the processing as aforesaid include the low proportion of caustic (sodium hydroxide) required, per acetyl group in the chitin, for deacetylation; while mol proportions no greater than 9:1 are adequate for the method disclosed herein, prior art processes for deacetylating chitin with caustic have typically used mol proportions of 18:1, 24:1, and even 140:1. Another factor is the lower deacetylation reaction temperature; for the method disclosed herein, a temperature of 75° C. to 100° C. is adequate, whereas prior art methods have generally required higher temperatures, ranging for example from 115° C. to 180° C. The lower temperature is particularly advantageous in that it also reduces the rate of oxidative degradation that occurs at elevated temperatures in alkaline media during deacetylation, especially if the reaction is not blanketed with nitrogen or other inert gas to reduce such degradation. It is known in the art that lack of a nitrogen blanket, during a deacetylation of chitin to chitosan, reduces the molecular weight of the chitosan product.

Throughout this description reference has been made to use of 1% aqueous solutions of N,O-carboxymethyl chitosan for various purposes. Such solutions generally have a convenient viscosity, but solutions of higher or lower concentration can equally well be used where the resulting solution viscosities are appropriate and/or convenient. Numerous other modifications obvious to those skilled in the art can be made in the specific expedients described herein without departing from the scope of the invention which is defined in the following claims.

What is claimed is:

1. N,O-carboxymethyl chitosan having a degree of substitution of carboxymethyl groups per glucosamine monomer unit in the chitosan of less than 1.0, with carboxymethyl groups being substituted on hydroxyl oxygen atoms of the glucosamine monomer units of the chitosan and carboxymethyl groups being substituted on nitrogen atoms of the glucosamine monomer units of the chitosan.

2. A method for the preparation of N,O-carboxymethyl chitosan which comprises
   (a) dispersing solid chitosan in a liquid medium of the group consisting of isopropyl alcohol, n-butanol, isobutanol, methyl ethyl ketone, toluene, and ethanol-toluene mixtures containing at least 72 mol percent toluene, to form a slurry,
   (b) steeping the chitosan in caustic medium by adding strong aqueous sodium hydroxide solution to the slurry, in a proportion of three to eight mols sodium hydroxide per mol of glucosamine monomer unit in the chitosan, with stirring to maintain the chitosan dispersed in the caustic medium for a period of from 0.5 to 1.0 hours,
   (c) thereafter adding monochloroacetic acid to the caustic medium, in a proportion of substantially one mol of the acid for each 1.8 to 2.2 mols of sodium hydroxide in the caustic medium, and heating the slurry with continued stirring to a reaction temperature of from substantially 40° C. to substantially 70° C.,
   (d) maintaining the stirred slurry at the reaction temperature for a reaction period of substantially two to twelve hours and sufficient to complete reaction between the chitosan and sodium monochloroacetate to form N,O-carboxymethyl chitosan,
   (e) adding to the slurry a small portion of water and a portion of glacial acetic acid in amounts sufficient respectively to enable measurement of the pH of the suspending liquid, and to bring the pH of the slurry to substantially 7.0, and
   (f) recovering the N,O-carboxymethyl chitosan product from the slurry by separating the solid thereof and washing same with solvents to remove extraneous salts without dissolving the product.

3. A method as claimed in claim 2, including preliminary preparation of the chitosan dispersed and steeped in said liquid medium by
   (a) dispersing granular sized chitin in the liquid medium, to form a slurry of chitin,
   (b) slowly adding a strong aqueous sodium hydroxide solution to the stirred slurry over a period of ten to 30 minutes and in a proportion to provide substantially five to nine mols sodium hydroxide per mol N-acetyl glucosamine units in the chitin,
   (c) heating the stirred slurry to a temperature in the range of 75° C. to 100° C. and maintaining it in this range for a period of 2.5 to 3.5 hours,
   (d) allowing the slurry to cool to ambient room temperature and to steep until the chitin has been deacetylated to chitosan and the chitosan has steeped in the caustic medium for a brief period not exceeding one hour.

4. A method as claimed in claim 3 in which the brief period is of 0.5 to 1.0 hour duration.

5. A polymer film selectively permeable to various gases, said film consisting of N,O-carboxymethyl chitosan having a composition as defined in claim 1.

6. A water resistant gel made from an aqueous solution of N,O-carboxymethyl chitosan by reaction of said solution with a material of the group consisting of cross-linking dialdehydes, cross-linking diketones, and aqueous solutions of ions of metals of the group consisting of iron, copper, mercury, nickel, silver, zinc, and calcium.

7. A gel as claimed in claim 6, in which the aqueous N,O-carboxymethyl chitosan solution is a 1% solution and the material is a solution of metal ions having a concentration of 100 to 10,000 ppm.

8. A gel as claimed in claim 6, in which the material is a dialdehyde in a proportion of from 0.5:1 to 1:1 by weight of the N,O-carboxymethyl chitosan.

* * * * *